US009934220B2

(12) United States Patent
Jenkins et al.

(10) Patent No.: US 9,934,220 B2
(45) Date of Patent: Apr. 3, 2018

(54) CONTENT REVISION USING QUESTION AND ANSWER GENERATION

(71) Applicant: International Business Machines Corporation, Armonk, NY (US)

(72) Inventors: Jana H Jenkins, Raleigh, NC (US); David C Steinmetz, Bothell, WA (US); Wlodek W Zadrozny, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 14/250,128

(22) Filed: Apr. 10, 2014

(65) Prior Publication Data

US 2014/0222822 A1    Aug. 7, 2014

Related U.S. Application Data

(63) Continuation of application No. 13/570,536, filed on Aug. 9, 2012.

(51) Int. Cl.
*G06F 7/00* (2006.01)
*G06F 17/30* (2006.01)
*G06F 17/28* (2006.01)

(52) U.S. Cl.
CPC .... *G06F 17/30011* (2013.01); *G06F 17/2881* (2013.01); *G06F 17/30722* (2013.01)

(58) Field of Classification Search
CPC ............... G06F 17/30; G06F 17/30011; G06F 17/30864; G06F 17/30598; G06N 99/005
See application file for complete search history.

(56) References Cited

U.S. PATENT DOCUMENTS

| 6,315,572 | B1 * | 11/2001 | Owens ..................... G09B 7/00 434/118 |
| 6,611,842 | B1 * | 8/2003 | Brown |
| 6,625,595 | B1 * | 9/2003 | Anderson et al. |
| 6,636,853 | B1 * | 10/2003 | Stephens, Jr. |
| 7,805,303 | B2 * | 9/2010 | Sugihara et al. ............. 704/257 |
| 7,873,519 | B2 * | 1/2011 | Bennett ......................... 704/257 |
| 7,912,702 | B2 * | 3/2011 | Bennett ............................ 704/9 |
| 8,019,753 | B2 * | 9/2011 | Podgorny et al. ............ 707/722 |
| 8,027,973 | B2 * | 9/2011 | Cao et al. ..................... 707/728 |
| 8,060,390 | B1 * | 11/2011 | Overstreet ................... 705/7.11 |
| 8,204,751 | B1 * | 6/2012 | Di Fabbrizio et al. ........ 704/275 |
| 2002/0111934 | A1 * | 8/2002 | Narayan ........................... 707/1 |
| 2002/0152224 | A1 * | 10/2002 | Roth et al. ................. 707/104.1 |
| 2006/0036462 | A1 * | 2/2006 | King et al. ........................ 705/1 |

(Continued)

*Primary Examiner* — Hosain Alam
*Assistant Examiner* — Nicholas Allen
(74) *Attorney, Agent, or Firm* — Kunzler, PC

(57) ABSTRACT

A method for question/answer creation for a document is described. The method includes importing a document having a set of questions based on content in the document. The method also includes automatically creating a candidate question from the content in the document. The method also includes automatically generating answers for the set of questions and the candidate question using the content in the document. The method also includes presenting the set of questions, the candidate question, and the answers to a content creator for user verification of accuracy. The method also includes storing a verified set of questions in the document. The verified set of questions includes the candidate question.

7 Claims, 4 Drawing Sheets

(56) References Cited

U.S. PATENT DOCUMENTS

| | | |
|---|---|---|
| 2006/0235689 A1 | 10/2006 | Sugihara et al. |
| 2007/0067293 A1* | 3/2007 | Yu .................................. 707/7 |
| 2007/0136246 A1* | 6/2007 | Stenchikova et al. ............ 707/3 |
| 2007/0274519 A1* | 11/2007 | Cohen et al. .................. 380/201 |
| 2008/0195378 A1* | 8/2008 | Nakazawa ........ G06F 17/30654 704/9 |
| 2008/0201121 A1 | 8/2008 | Yano |
| 2008/0294637 A1* | 11/2008 | Liu .................................. 707/6 |
| 2008/0319962 A1* | 12/2008 | Riezler et al. .................... 707/4 |
| 2009/0287678 A1* | 11/2009 | Brown et al. ...................... 707/5 |
| 2010/0030770 A1* | 2/2010 | Cao et al. ......................... 707/5 |
| 2010/0063797 A1* | 3/2010 | Cong et al. ....................... 704/9 |
| 2010/0081120 A1* | 4/2010 | Nanjiani et al. ............... 434/322 |
| 2010/0191686 A1* | 7/2010 | Wang et al. .................... 706/46 |
| 2010/0228711 A1* | 9/2010 | Li et al. ......................... 707/706 |
| 2010/0235341 A1* | 9/2010 | Bennett .......................... 707/706 |
| 2011/0060584 A1 | 3/2011 | Ferrucci et al. |
| 2011/0065082 A1* | 3/2011 | Gal et al. ....................... 434/365 |
| 2011/0066587 A1 | 3/2011 | Ferrucci et al. |
| 2011/0096174 A1* | 4/2011 | King et al. .................. 348/207.1 |
| 2011/0125734 A1* | 5/2011 | Duboue et al. ............... 707/723 |
| 2011/0153312 A1* | 6/2011 | Roberts .............................. 704/9 |
| 2011/0257961 A1* | 10/2011 | Tinkler et al. .................... 704/9 |
| 2011/0320187 A1* | 12/2011 | Motik et al. ...................... 704/9 |
| 2012/0041950 A1 | 2/2012 | Koll et al. |
| 2012/0078826 A1* | 3/2012 | Ferrucci et al. ................ 706/12 |
| 2012/0084293 A1* | 4/2012 | Brown .................... A61B 5/00 707/741 |
| 2012/0095977 A1* | 4/2012 | Levin et al. ................... 707/706 |
| 2012/0098217 A1* | 4/2012 | Cleveland et al. .............. 280/30 |
| 2012/0107789 A1* | 5/2012 | Desruisseaux ................ 434/362 |
| 2012/0164169 A1* | 6/2012 | Thirion et al. ............... 424/199.1 |
| 2012/0191716 A1* | 7/2012 | Omoigui ....................... 707/740 |

\* cited by examiner

CONTENT REVISION USING QUESTION AND ANSWER GENERATION

CROSS-REFERENCE TO RELATED APPLICATIONS

This application is a continuation of U.S. application Ser. No. 13/570,536, filed on Aug. 9, 2012, which is incorporated by reference herein in its entirety.

BACKGROUND

Generally, question answering is a type of information retrieval. Given a collection of documents (such as on the World Wide Web or a local database) the system should be able to retrieve and/or construct answers to questions using natural language processing techniques that are typically more complex than for other types of information retrieval. Understanding the specific user query and finding the appropriate documents that might contain the answer to the user query can be challenging.

Question answering research attempts to deal with a wide range of question types including: fact, list, definition, how, why, hypothetical, semantically-constrained, and cross-lingual questions, among others. Search collections vary from small local document collections, to internal organization documents, to compiled newswire reports, to much larger and more comprehensive corpuses such as the World Wide Web.

SUMMARY

Embodiments of a system are described. In one embodiment, the system is a question/answer creation system. The system includes: a memory device and a processor connected to the memory device. The processor is configured to import a document having a set of questions based on content in the document. The processor is also configured to automatically create a candidate question from the content in the document. The processor is also configured to automatically generate answers for the set of questions and the candidate question using the content in the document. The processor is also configured to present the set of questions, the candidate question, and the answers to a content creator for user verification of accuracy. The processor is also configured to store a verified set of questions in the document. The verified set of questions includes the candidate question. Other embodiments of the system, a method, and a computer program product are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
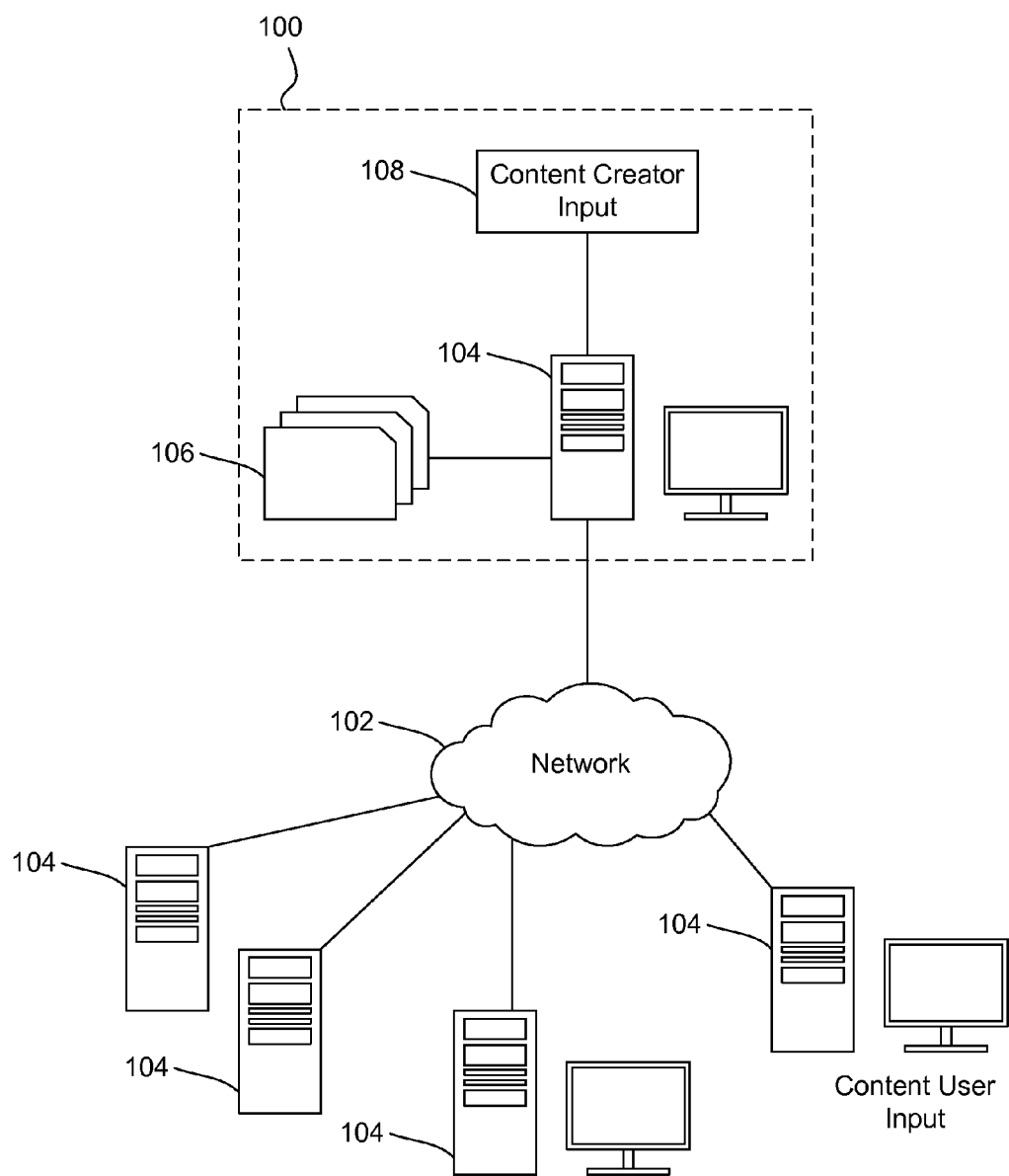
FIG. 1 depicts a schematic diagram of one embodiment of a question/answer creation (QAC) system in a computer network.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for question/answer creation (QAC) for a document. More specifically, the system is able to find questions in the content (both in the viewable text of the content and the metadata associated with the content) and create candidate questions using the content, and then answer the questions and candidate questions by analyzing the content of the document. The system presents the questions, candidate questions, and answers to a content creator for verification and stores the verified questions and answers in the document content. The content creator may also categorize questions to further enable the system to adequately answer questions from a content user.

Accessing information from a corpus of data typically includes: a database query that answers questions about what is in a collection of structure records; and a search that delivers a collection of document links in response to a query against a collection of unstructured data (text, markup language, etc.). Conventional question answering systems are capable of generating question and answer pairs based on the corpus of data, verifying answers to a collection of questions for the corpus of data, correcting errors in digital text using a corpus of data, and selecting answers to questions from a pool of potential answers. However, such systems may not be capable of proposing and inserting new questions which may not have been specified previously in conjunction with the corpus of data. Also, such systems may not validate the questions in accordance with the content of the corpus of data.

Content creators, such as article authors, may determine use cases for products, solutions, and service before writing the content. Consequently, the content creators may know what questions the content is intended to answer in a particular topic. Categorizing the questions in each document of a document corpus may allow the system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QAC system.

FIG. 1 depicts a schematic diagram of one embodiment of a question/answer creation (QAC) system 100 in a computer network 102. One example of a question/answer generation which may be used in conjunction with the principles described herein is described in U.S. Pat. Pub. No. 2011/0125734, which is herein incorporated by reference for all it contains. The QAC system 100 may include a computing device 104 connected to the computer network 102. The network 102 may include multiple computing devices 104 in communication with each other and with other devices or components. The QAC system 100 and network 102 may enable question/answer (QA) generation functionality for one or more content users. Other embodiments of the QAC system 100 may be used with components, systems, subsystems, and/or devices than are depicted herein.

The QAC system 100 may be configured to receive inputs from various sources. For example, the QAC system 100 may receive input from the network 102, a corpus of documents 106 or other data, a content creator 108, content users, and other possible sources of input. In one embodiment, some or all of the inputs to the QAC system 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that the QAC system 100 may operate in environments of any size, including local and global.

In one embodiment, the content creator creates content in a document 106 for use with the QAC system 100. The document 106 may include any file, text, article, or source of data for use in the QAC system 100. Content users may access the QAC system 100 via a network connection or an Internet connection to the network 102, and may input questions to the QAC system 100 that may be answered by the content in the corpus of data. In one embodiment, the questions may be formed using natural language. The QAC system 100 may interpret the question and provide a response to the content user containing one or more answers to the question. In some embodiments, the QAC system 100 may provide a response to content users in a ranked list of answers.

Figure 2:
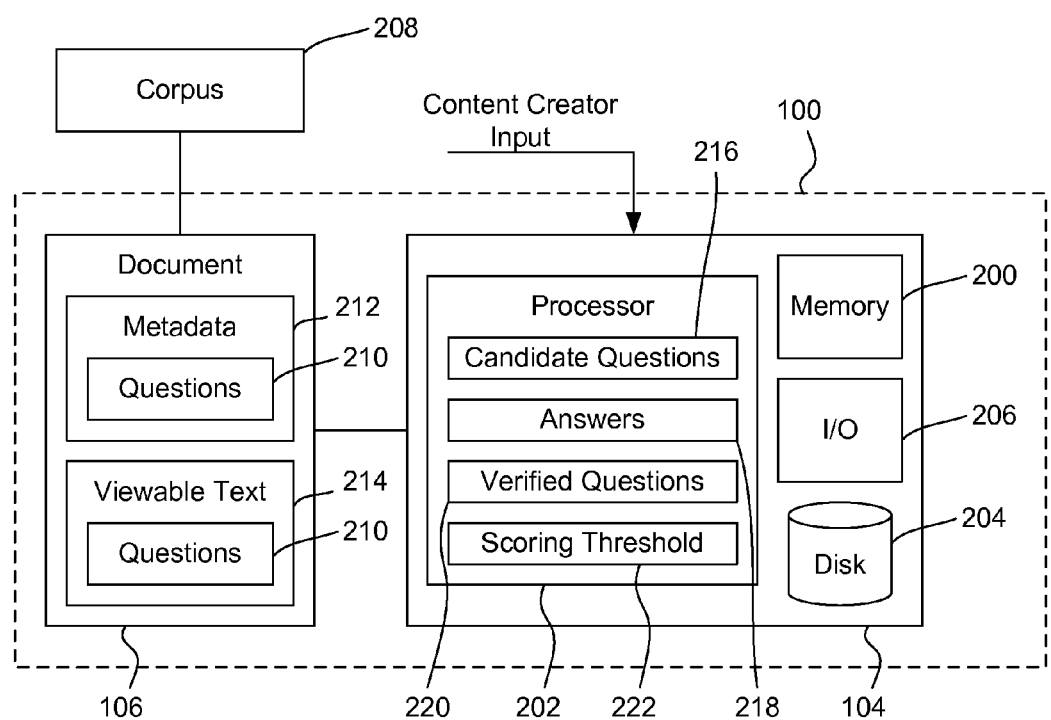
FIG. 2 depicts a schematic diagram of one embodiment of the question/answer creation (QAC) system of FIG. 1.
Figure 4:
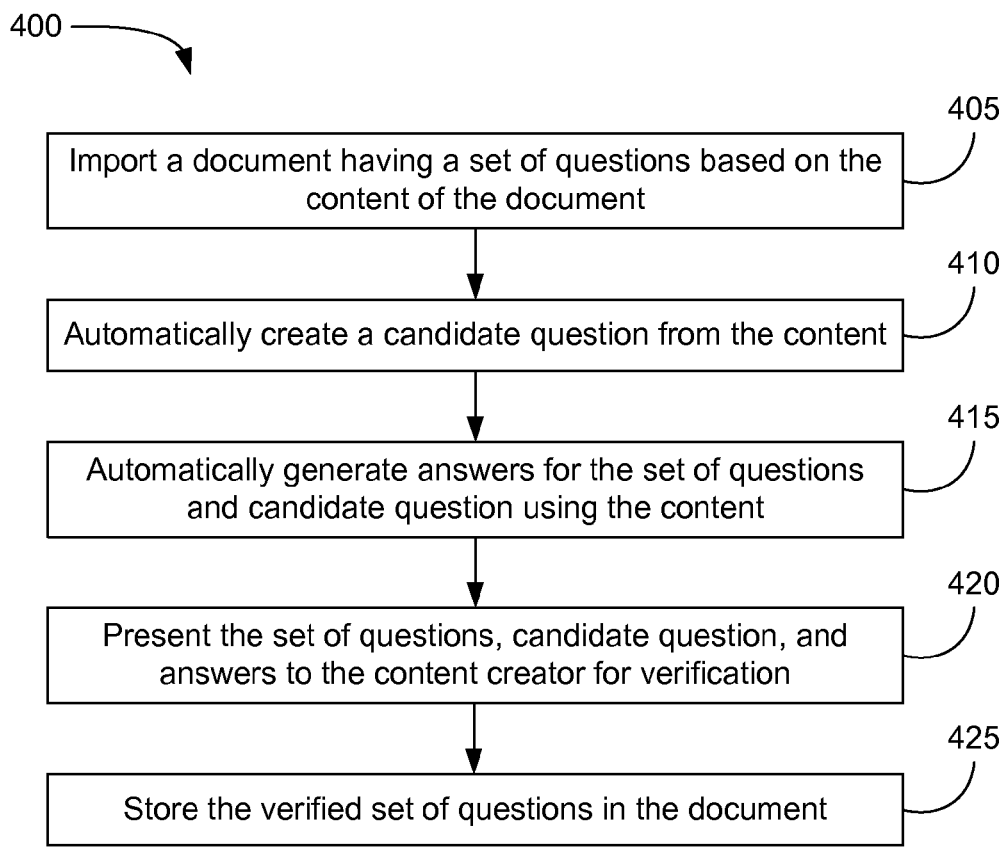
FIG. 4 depicts a flowchart diagram of one embodiment of a method for question/answer creation for a document.

FIG. 2 depicts a schematic diagram of one embodiment of the QAC system 100 of FIG. 1. The depicted QAC system 100 includes various components, described in more detail below, that are capable of performing the functions and operations described herein. In one embodiment, at least some of the components of the QAC system 100 are implemented in a computer system. For example, the functionality of one or more components of the QAC system 100 may be implemented by computer program instructions stored on a computer memory device 200 and executed by a processing device such as a CPU. The QAC system 100 may include other components, such as a disk storage drive 204, and input/output devices 206, and at least one document 106 from a corpus 208. Some or all of the components of the gestural control system 100 may be stored on a single computing device 104 or on a network of computing devices 104, including a wireless communication network. The QAC system 100 may include more or fewer components or subsystems than those depicted herein. In some embodiments, the QAC system 100 may be used to implement the methods described herein as depicted in FIG. 4.

In one embodiment, the QAC system 100 includes at least one computing device 104 with a processor 202 for performing the operations described herein in conjunction with the QAC system 100. The processor 202 may include a single processing device or multiple processing devices. The processor 202 may have multiple processing devices in different computing devices 104 over a network such that the operations described herein may be performed by one or more computing devices 104. The processor 202 is connected to and in communication with the memory device. In some embodiments, the processor 202 may store and access data on the memory device 200 for performing the operations described herein. The processor 202 may also be connected to a storage disk 204, which may be used for data storage, for example, for storing data from the memory device 200, data used in the operations performed by the processor 202, and software for performing the operations described herein.

In one embodiment, the QAC system 100 imports a document 106. The document 106 may be part of a larger corpus 208 of data, which may contain documents 106 related to a specific topic or a variety of topics. The corpus 208 of data may include any number of documents 106 and may be stored in any location relative to the QAC system 100. The QAC system 100 may be capable of importing any of the documents 106 in the corpus 208 of data for processing by the processor 202. The processor 202 may communicate with the memory device 200 to store data while the corpus 208 is being processed.

The document 106 may include a set of questions 210 generated by the content creator at the time the content was created. When the content creator creates the content in the document 106, the content creator may determine one or more questions that may be answered by the content or for specific use cases for the content. The content may be created with the intent to answer specific questions. These questions may be inserted into the content, for example, by inserting the set of questions 210 into the viewable content/text 214 or in metadata 212 associated with the document 106. In some embodiments, the set of questions 210 shown in the viewable text 214 may be displayed in a list in the document 106 so that the content users may easily see specific questions answered by the document 106.

The set of questions 210 created by the content creator at the time the content is created may be detected by the processor 202. The processor 202 may further create one or more candidate questions 216 from the content in the document 106. The candidate questions 216 include questions that are answered by the document 106, but that may not have been entered or contemplated by the content creator. The processor 202 may also attempt to answer the set of questions 210 created by the content creator and extracted from the document 106. In one embodiment, the processor 202 determines that one or more of the questions are answered by the content of the document 106 and lists or otherwise marks the questions that were answered in the document 106. The QAC system 100 may also attempt to provide answers 218 for the candidate questions 216. In one embodiment, the QAC system 100 answers 218 the set of questions 210 created by the content creator before creating the candidate questions 216. In another embodiment, the QAC system 100 answers 218 the questions and the candidate questions 216 at the same time.

The QAC system 100 may score question/answer pairs generated by the system. In such an embodiment, question/answer pairs that meet a scoring threshold are retained, and question/answer pairs that do not meet the scoring threshold 222 are discarded. In one embodiment, the QAC system 100 scores the questions and answers separately, such that questions generated by the system 100 that are retained meet a question scoring threshold, and answers found by the system 100 that are retained meet an answer scoring threshold. In another embodiment, each question/answer pair is scored according to a question/answer scoring threshold.

After creating the candidate questions 216, the QAC system 100 may present the questions and candidate questions 216 to the content creator for manual user verification. The content creator may verify the questions and candidate questions 216 for accuracy and relatedness to the content of the document 106. The content creator may also verify that the candidate questions 216 are worded properly and are easy to understand. If the questions contain inaccuracies or are not worded properly, the content creator may revise the content accordingly. The questions and candidate questions 216 that have been verified or revised may then be stored in the content of the document 106 as verified questions, either in the viewable text 214 or in the metadata 212 or both.

Figure 3:
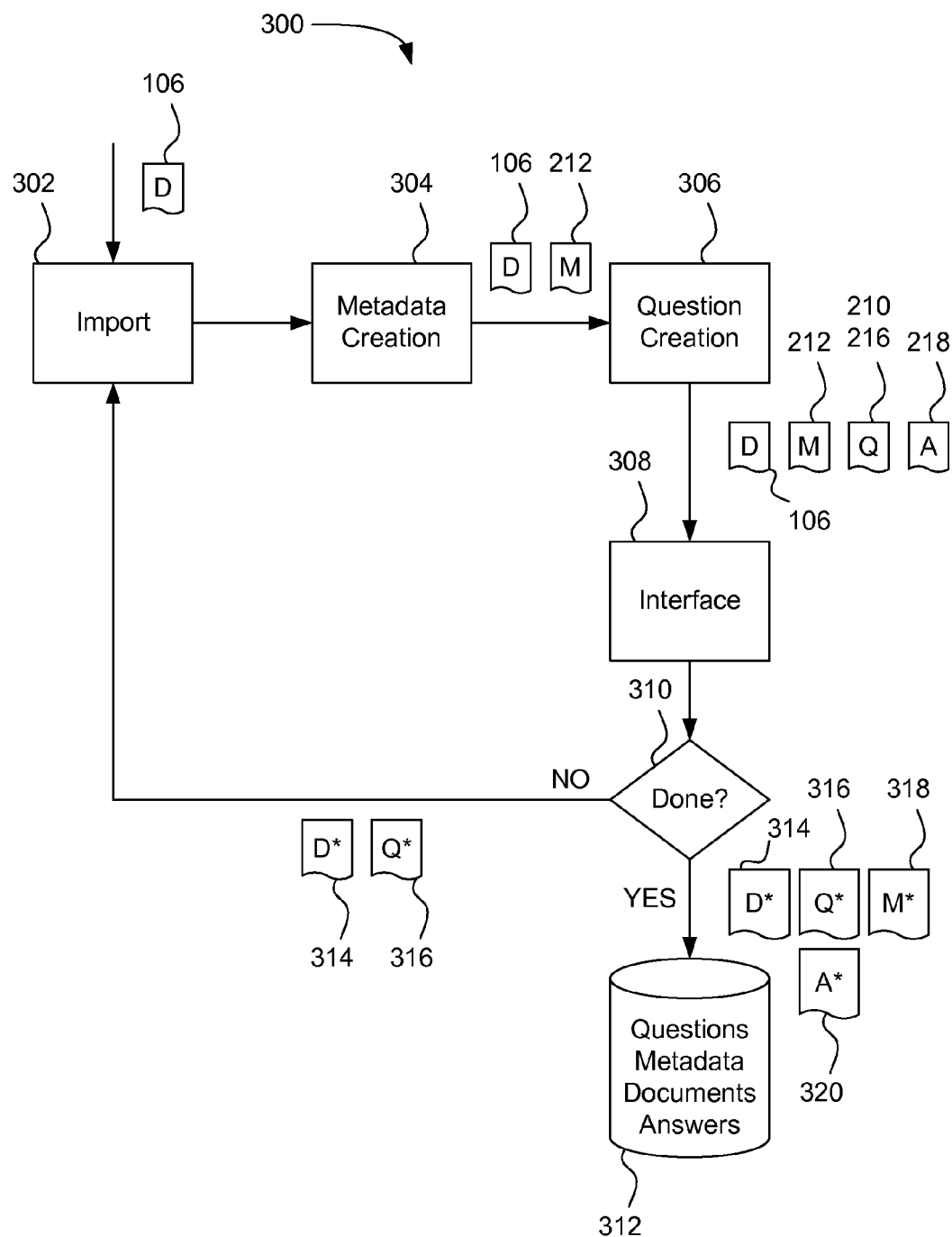
FIG. 3 depicts a flowchart diagram of one embodiment of a method for question/answer creation for a document.

FIG. 3 depicts a flowchart diagram of one embodiment of a method 300 for question/answer creation for a document 106. Although the method 300 is described in conjunction with the QAC system 100 of FIG. 1, the method 300 may be used in conjunction with any type of QAC system 100.

In one embodiment, the QAC system 100 imports 302 one or more documents 106 from a corpus 208 of data. This may include retrieving the documents 106 from an external source, such as a storage device in a local or remote computing device 104. The documents 106 may be processed so that the QAC system 100 is able to interpret the content of each document 106. This may include parsing the content of the documents 106 to identify questions found in the documents 106 and other elements of the content. The system 100 may parse documents using document markup to identify questions. For example, if documents are in extensible markup language (XML) format, portions of the documents could have XML question tags. In such an embodiment, an XML parser may be used to find appropriate document parts. In another embodiment, the documents are parsed using NLP techniques to find questions. For example, the NLP techniques may include finding sentence boundaries and looking at sentences that end with a question mark or other methods. The QAC system 100 may use language processing techniques to parse the documents 106 into sentences and phrases, for example.

In one embodiment, the content creator creates 304 metadata 212 for a document 106, which may contain information related to the document 106, such as file information, search tags, questions created by the content creator, and other information. In some embodiments, metadata 212 may already be stored in the document 106, and the metadata 212 may be modified according to the operations performed by the QAC system 100. Because the metadata 212 is stored with the document content, the questions created by the content creator may be searchable via a search engine configured to perform searches on the corpus 208 of data, even though the metadata 212 may not be visible when the document 106 is opened by a content user. Thus, the metadata 212 may include any number of questions that are answered by the content without cluttering the document 106.

The content creator may create 306 more questions based on the content, if applicable. The QAC system 100 also generates candidate questions 216 based on the content that may not have been entered by the content creator. The candidate questions 216 may be created using language processing techniques designed to interpret the content of the document 106 and generate the candidate questions 216 so that the candidate questions 216 may be formed using natural language.

When the QAC system 100 creates the candidate questions 216 or when the content creator enters questions into the document 106, the QAC system 100 may also locate the questions in the content and answer the questions using language processing techniques. In one embodiment, this process includes listing the questions and candidate questions 216 for which the QAC system 100 is able to locate answers 218 in the metadata 212. The QAC system 100 may also check the corpus 208 of data or another corpus 208 for comparing the questions and candidate questions 216 to other content, which may allow the QAC system 100 to determine better ways to form the questions or answers 218. Examples of providing answers to questions from a corpus are described in U.S. Pat. Pub. No. 2009/0287678 and U.S. Pat. Pub. No. 2009/0292687, which are herein incorporated by reference for all they contain.

The questions, candidate questions 216, and answers 218 may then be presented 308 on an interface to the content creator for verification. In some embodiments, the document text and metadata 212 may also be presented for verification. The interface may be configured to receive a manual input from the content creator for user verification of the questions, candidate questions 216, and answers 218. For example, the content creator may look at the list of questions and answers 218 placed in the metadata 212 by the QAC system 100 to verify that the questions are paired with the appropriate answers 218, and that the question-answer pairs are found in the content of the document 106. The content creator may also verify that the list of candidate questions 216 and answers 218 placed in the metadata 212 by the QAC system 100 are correctly paired, and that the candidate question-answer pairs are found in the content of the document 106. The content creator may also analyze the questions or candidate questions 216 to verify correct punctuation, grammar, terminology, and other characteristics to improve the questions or candidate questions 216 for searching and/or viewing by the content users. In one embodiment, the content creator may revise poorly worded or inaccurate questions and candidate questions 216 or content by adding terms, adding explicit questions or question templates that the content answers 218, adding explicit questions or question templates that the content does not answer, or other revisions. Question templates may be useful in allowing the content creator to create questions for various topics using the same basic format, which may allow for uniformity among the different content. Adding questions that the content does not answer to the document 106 may improve the search accuracy of the QAC system 100 by eliminating content from the search results that is not applicable to a specific search.

After the content creator has revised the content, questions, candidate questions 216, and answers 218, the QAC system 100 may determine 310 if the content finished being processed. If the QAC system 100 determines that the content is finished being processed, the QAC system 100 may then store 312 the verified document 314, verified questions 316, verified metadata 318, and verified answers 320 in a data store on which the corpus 208 of data is stored. If the QAC system 100 determines that the content is not finished being processed—for example if the QAC system 100 determines that additional questions may be used—the QAC system 100 may perform some or all of the steps again. In one embodiment, the QAC system 100 uses the verified document and/or the verified questions to create new metadata 212. Thus, the content creator or QAC system 100 may create additional questions or candidate questions 216, respectively. In one embodiment, the QAC system 100 is configured to receive feedback from content users. When the QAC system 100 receives feedback from content users, the QAC system 100 may report the feedback to the content creator, and the content creator may generate new questions or revise the current questions based on the feedback.

FIG. 4 depicts a flowchart diagram of one embodiment of a method 400 for question/answer creation for a document 106. Although the method 400 is described in conjunction with the QAC system 100 of FIG. 1, the method 400 may be used in conjunction with any QAC system 100.

The QAC system 100 imports 405 a document 106 having a set of questions 210 based on the content of the document 106. The content may be any content, for example content directed to answering questions about a particular topic or a range of topics. In one embodiment, the content creator categorizes the set of questions 210 at the top of the content or in some other location of the document 106. The categorization may be based on the content of the questions, the style of the questions, or any other categorization technique. The set of questions 210 may be obtained by scanning the viewable content 214 of the document 106 or metadata 212 associated with the document 106. The set of questions 210 may be created by the content creator when the content is created. In one embodiment, the QAC system 100 automatically creates 410 at least one suggested or candidate question 216 based on the content in the document 106. The candidate question 216 may be a question that the content creator did not contemplate. The candidate question 216 may be created by processing the content using language processing techniques to parse and interpret the content. The system 100 may detect a pattern in the content of the document 106 that is common for other content in the corpus 208 to which the document 106 belongs, and may create the candidate question 216 based on the pattern.

The QAC system 100 also automatically generates 415 answers 218 for the set of questions 210 and the candidate question 216 using the content in the document 106. The QAC system 100 may generate the answers 218 for the set of questions 210 and the candidate question 216 at any time after creating the questions and candidate question 216. In some embodiments, the answers 218 for the set of questions 210 may be generated during a different operation than the answer for the candidate question 216. In other embodiments, the answers 218 for both the set of questions 210 and the candidate question 216 may be generated in the same operation.

The QAC system 100 then presents 420 the set of questions 210, the candidate question 216, and the answers 218 for the set of questions 210 and the candidate question 216 to the content creator for user verification of accuracy. In one embodiment, the content creator also verifies the questions and candidate questions 216 for applicability to the content of the document 106. The content creator may verify that the content actually contains the information contained in the questions, candidate question 216, and respective answers 218. The content creator may also verify that the answers 218 for the corresponding questions and candidate question 216 contain accurate information. The content creator may also verify that any data in the document 106 or generated by the QAC system 100 in conjunction with the QAC system 100 is worded properly.

A verified set of questions 220 may then be stored 425 in the document 106. The verified set of questions 220 may include at least one verified question from the set of questions 210 and the candidate question 216. The QAC system 100 populates the verified set of questions 220 with questions from the set of questions 210 and candidate questions 216 that are determined by the content creator to be accurate. In one embodiment, any of the questions, candidate questions 216, answers 218, and content that is verified by the content creator is stored in the document 106, for example, in a data store of a database.

In one embodiment, the QAC system 100 is also configured to receive feedback related to the document 106 from content users. The system 100 may receive an input from the content creator to create a new question corresponding to the content in the document 106 and based on the feedback. The system 100 may then automatically generate answers 218 for the new question using the content in the document 106. The content creator may also revise at least one question from the set of questions 210 and candidate questions 216 to correctly reflect the content in the document 106. The revision may be based on the content creator's own verification of the questions and candidate questions 216 or the feedback from content users.

Although other embodiments of the method may be used in conjunction with the QAC system 100, one embodiment of the method used in conjunction with the QAC system 100 as described herein is shown below:

1. The content creator determines use cases.
2. The content is created.
3. The content creator lists and categorizes the questions that are answered in the content at the top of the content topic.
4. The system scans the title of the document and the question list.
5. The system locates a question based on the question list and the answer to the question.
6. The system lists the questions that can be answered based on the document/content.
7. The system lists the candidate questions that can possibly be created.

8. The system checks the corpus to which the content/document belongs to see how other content in the corpus answers the same questions.
9. The content creator revises the content, for example, by adding terms, adding explicit questions/question templates that the content answers, or adding explicit questions/question templates that the content does not answer.

An example following the steps of the method described above includes:

1. A use case includes "Importing a document into a requirements project."
2. The content is a document accessible via a document search.
3. The content creator (document author) creates questions that are answered at the top of the document:
    a. "How do I import a document into a requirements project?"
    b. "How do I get a <specific document type> into the requirements project?"
4. The system checks that the document includes the questions from step 3 are included in the document or question list corresponding to the document.
5. The system answers the questions using the document content. For example, there is a perfect match for question (a) in the document title, and there may be a conditional match for the question (b).
6. The system lists other questions that are answered by the content. These may include questions not already listed, which may be based on common patterns for the corpus (or other sources) that are detected in the document by the system.
    a. For example, the system returns the question "What's the difference between 'the content is converted into a rich-text format' and 'the process of uploading a file'?" based on the following document content:
    b. "When you import a document, the content is converted into a rich-text format. This differs from the process of uploading a file."
7. The system also suggests candidate questions that may be answered by the document. For example, candidate questions may be based on the proximity of words in the document. Thus, the system may detect the proximity of "import" to words describing document types. Some natural language processing may be used to avoid mistakes. For example, if the content contains "The system currently does not support imports of .avi or other movie content," the system may detect the negative statement. With this caveat, for the content:
    a. "You can import these document types:
        <document type 1>
        <document type 2>
        <document type 3>"
    b. The system generates 3 questions:
        i. "How do I import <document type 1>?"
        ii. "How do I import <document type 2>?"
        iii. "How do I import <document type 3>?"
8. The system checks other documents in the corpus to which the specific document belongs to answer the candidate questions.
9. The author adjusts the question list. For example, for the question listed in (6)(a), the author changes the question to "What's the difference between 'importing a document' and 'the process of uploading a file'?" because the original question generated by the system was inaccurate based on the document content. The author may adjust any of the questions created previously by the author or generated by the system. In one embodiment, editing is achieved by leveraging a user interface with regular expressions for alternatives or by checklists.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

An embodiment of a QAC system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for question/answer creation for a document, comprising:
   importing, using a processor, a document created by a content creator, the document having a set of questions based on content in the document, wherein the document is a single file;
   scanning, using a processor, the content of the document and metadata in the document;
   automatically creating, using a processor, a candidate question not entered by the content creator, creating the candidate question from the content in the document and the metadata of the document, wherein the metadata is not visible when the document is opened by a content user;
   automatically generating, using a processor, answers for the set of questions and the candidate question using the content in the document;
   presenting, using a processor, the set of questions, the candidate question, and the answers to a content creator for user verification of accuracy; and
   storing, using a processor, a verified set of questions in the document, wherein the verified set of questions comprises at least one verified question from the set of questions and the candidate question.

2. The method of claim 1, wherein automatically creating the candidate question further comprises:
   detecting, using a processor, a pattern in the content of the document that is common for other content in a corpus to which the document belongs; and
   creating, using a processor, the candidate question based on the pattern.

3. The method of claim 1, wherein importing the document further comprises:
   scanning, using a processor, viewable content of the document and metadata in the document to obtain the set of questions; and
   categorizing, using a processor, the set of questions based on the content of the document.

4. The method of claim 1, further comprising:
verifying, using a processor, the set of questions, the candidate question, and the answers for accuracy according to the content of the document and applicability to the content of the document; and
revising, using a processor, the candidate question to correctly reflect the content in the document.

5. The method of claim 1, further comprising:
scoring, using a processor, question/answer pairs generated by the system, wherein question/answer pairs that meet a scoring threshold are retained.

6. The method of claim 1, wherein storing the verified set of questions in the document further comprises:
populating, using a processor, the verified set of questions with the candidate question in response to determining that the candidate question is accurate based on the content.

7. The method of claim 1, further comprising:
receiving, using a processor, feedback from a user, wherein the feedback is related to the document;
receiving, using a processor, an input from the content creator to create a new question corresponding to the content in the document and based on the feedback; and
automatically generating, using a processor, answers for the new question using the content in the document.

* * * * *